(12) United States Patent
Kazda et al.

(10) Patent No.: US 10,078,722 B2
(45) Date of Patent: Sep. 18, 2018

(54) DYNAMIC MICROPROCESSOR GATE DESIGN TOOL FOR AREA/TIMING MARGIN CONTROL

(71) Applicant: INTERNATIONAL BUSINESS MACHINES CORPORATION, Armonk, NY (US)

(72) Inventors: Michael A. Kazda, Poughkeepsie, NY (US); Arjen A. Mets, Sleepy Hollow, NY (US); Lakshmi N. Reddy, Briarcliff Manor, NY (US); Cindy S. Washburn, Poughquag, NY (US); Nancy Y. Zhou, Cedar Park, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/180,339

(22) Filed: Jun. 13, 2016

(65) Prior Publication Data

US 2017/0357747 A1    Dec. 14, 2017

(51) Int. Cl.
    *G06F 17/50* (2006.01)
(52) U.S. Cl.
    CPC ...... *G06F 17/5081* (2013.01); *G06F 2217/68* (2013.01); *G06F 2217/84* (2013.01)
(58) Field of Classification Search
    CPC ............... B41J 2/04541; B41J 2/04573; B41J 2/04543; G06F 21/554; G06F 21/57; G06F 21/575; G06F 21/64; G06F 21/71; G06F 21/73; G06F 21/74; G06F 21/75; G06F 21/78; G06F 17/5068; G06F 17/5081; G06F 2217/68

USPC .................................................. 716/110–117
See application file for complete search history.

(56) References Cited

U.S. PATENT DOCUMENTS

| 6,389,581 | B1 * | 5/2002 | Muddu ............... G06F 17/5022 716/114 |
| 7,185,308 | B2 | 2/2007 | Shalish |
| 7,272,811 | B2 | 9/2007 | Kurokawa et al. |
| 8,112,734 | B2 | 2/2012 | Mbouombouo et al. |
| 8,336,017 | B2 | 12/2012 | Kadiyala |
| 8,776,004 | B2 | 7/2014 | Borkam et al. |

(Continued)

FOREIGN PATENT DOCUMENTS

| CN | 101894178 A | 7/2013 |
| JP | 2013257646 A | 12/2007 |
| JP | 2003196336 A | 10/2012 |

*Primary Examiner* — Binh Tat
(74) *Attorney, Agent, or Firm* — Cantor Colburn LLP; Steven Meyers (57) ABSTRACT

A computer-implemented method for optimizing microprocessor gates in a microprocessor includes receiving, via a processor, a dataset comprising a model of a plurality of gates of a microprocessor; determining, via the processor, whether a transmission line in the model, if implemented in a physical circuit, would result a signal transmission time less than a predetermined threshold time; applying to the model, via the processor, a proposed gate change to one or more of the plurality of gates; evaluating, via the processor and an area degradation based on the proposed gate change; determining, via the processor, a margin value based on the signal transmission time and an area degradation value; and making, via the processor, a gate change decision based on the margin value.

18 Claims, 4 Drawing Sheets

Method for Optimizing Microprocessor Gates (56) References Cited

U.S. PATENT DOCUMENTS

| | | |
|---|---|---|
| 8,984,456 B2 | 3/2015 | Kanno |
| 9,141,739 B2 | 9/2015 | Ishikawa et al. |
| 2001/0010090 A1* | 7/2001 | Boyle .................. G06F 17/505 |
| | | 716/105 |
| 2004/0216060 A1* | 10/2004 | Dickey ............... G06F 17/5045 |
| | | 716/115 |
| 2011/0191734 A1 | 8/2011 | Hayakawa et al. |
| 2012/0030642 A1 | 2/2012 | Mottaez et al. |
| 2013/0080987 A1* | 3/2013 | Kipper ................ G06F 17/5031 |
| | | 716/113 |

* cited by examiner

FIG. 1: Exemplary Computer

FIG. 2: Method for Optimizing Microprocessor Gates

FIG. 3: Method For Determining a Margin Value

400

1. If ( $delta_{timing}$ < $min\_improvement_{early}$ ) then:
   - reject transformation
2. If ( $delta_{timing}$ > $max\_improvement_{early}$ ) then:
   - accept transformation
3. $scaled\_margin_{early}$ = $margin_{early}$ ( 1 +
   $margin\_scale\_factor_{early}$ * ( $delta_{timing}$ - $min\_improvement_{early}$ ) /
   ( $max\_improvement_{early}$ - $min\_improvement_{early}$ ) )
4. if ( ( $scaled\_margin_{early}$ * $delta_{timing}$ ) > $delta_{area}$ ) then
   - accept transformation
   else
   - reject transformation

FIG. 4: Algorithm for Dynamically Optimizing Microprocessor Gates

DYNAMIC MICROPROCESSOR GATE DESIGN TOOL FOR AREA/TIMING MARGIN CONTROL

BACKGROUND

The present disclosure relates to microprocessor design, and more specifically, to a dynamic microprocessor gate design tool for area/timing margin control.

Gate timing optimization in the physical synthesis of microprocessor designs may include improving or optimizing the timing of signals passing from an input through one or more gates to an output. Gate timing optimizations increase or decrease the area needed on a chip to implement the timing improvements because signal timing is affected by gate size. Power needed to operate the chip is also affected by increases or decreases in gate size during the optimization process.

The gate timing optimization process can include making small design transformations to gates, evaluating the changes to the circuit performance resulting from the gate change, and either accepting or rejecting the particular change. An important measurement for gate optimization is gate timing, which measures the units of time needed for a signal to travel from the signal input through one or more gates to the output. When a circuit is specified, there is often a timing requirement specified that indicates the expected time for the signal to travel from the input to another.

When the actual travel time exceeds the specified (expected) quantity of time, then the design process includes "closing" the gate timing to make the circuit meet the specified timing requirement. For example, the path of an input to output may leave the input at 0 time units and is expected to reach the output at 100 units. After testing, it may be determined that the signal is reaching the output at 120 units. Accordingly, this particular design has a "slack" of −20 units. Thus, engineers are tasked with increasing efficiency to speed the path by 20 time units to close the timing. The slack can be minimized by making various changes to the circuit, such as shortening wires, increasing gate sizes, etc., in order to reduce the −20 unit slack.

A gate design change may result in a change to a gate size that increases signal transmission speed from input to output. For example, a gate may be small in size, which may require a small amount of power to operate, but it cannot pass the signal quick enough to meet the specified transmission time. Although the time may be decreased by increasing the gate size, the design change comes at a cost to the design in terms of chip area needed to implement the design and power requirements for operating the chip. An optimization can include transforming a gate size to speed signal transmission by a few units of time. For example, a gate may be relatively small in size, but it cannot pass the signal quick enough to achieve a desired transmission time. Even if an improvement in speed is realized by increasing gate size, the improvements must be contrasted with cost in terms of chip size and manufacturing cost. It may be advantageous to provide a system and method that dynamically optimizes gate/time margins by maximizing time improvements while minimizing area, power and manufacturing costs.

SUMMARY

According to an embodiment of the present invention, a computer-implemented method for optimizing microprocessor gates in a microprocessor is described. The method may include receiving, via a processor, a dataset comprising a model of a plurality of gates of a microprocessor; determining, via the processor, whether a transmission line in the model, if implemented in a physical circuit, would result a signal transmission time less than a predetermined threshold time; applying to the model, via the processor, a proposed gate change to one or more of the plurality of gates, wherein the proposed gate change results in a signal transmission time less than the predetermined threshold time; evaluating, via the processor and an area degradation based on the proposed gate change; determining, via the processor, a margin value based on the signal transmission time and an area degradation value, wherein the margin value is indicative of a weighted comparison of the signal transmission time and the area degradation of the proposed gate change; making, via the processor, a gate change decision based on the margin value, wherein the gate change decision comprises one action of a list of actions comprising modifying the dataset to include the proposed gate change or outputting the model without the proposed gate change; and outputting a modified dataset.

According to other embodiments, a system for optimizing microprocessor gates in a microprocessor is described. The system may include a processor configured to: receive a dataset comprising a model of a plurality of gates of a microprocessor; determine whether a transmission line in the model, if implemented in a physical circuit, would result a signal transmission time less than a predetermined threshold time; apply to the model a proposed gate change to one or more of the plurality of gates, wherein the proposed gate change results in a signal transmission time less than the predetermined threshold time; evaluate an area degradation value based on the proposed gate change; determine a margin value based on the signal transmission time and the area degradation value, wherein the margin value is indicative of a weighted comparison of the signal transmission time, the area degradation of the proposed gate change; make a gate change decision based on the margin value, wherein the gate change decision comprises one action of a list of actions comprising modifying the dataset to include the proposed gate change or outputting the model without the proposed gate change; and output a modified dataset.

According to yet other embodiments, a computer program product for optimizing microprocessor gates in a microprocessor is described. The computer program product includes a computer readable storage medium having program instructions embodied therewith, wherein the computer readable storage medium is not a transitory signal per se. The program instructions are executable by a processor to cause the processor to perform a method. The method may include receiving, via a processor, a dataset comprising a model of a plurality of gates of a microprocessor; determining, via the processor, whether a transmission line in the model, if implemented in a physical circuit, would result a signal transmission time less than a predetermined threshold time; applying to the model, via the processor, a proposed gate change to one or more of the plurality of gates, wherein the proposed gate change results in a signal transmission time less than the predetermined threshold time; evaluating, via the processor and an area degradation based on the proposed gate change; determining, via the processor, a margin value based on the signal transmission time and an area degradation value, wherein the margin value is indicative of a weighted comparison of the signal transmission time and the area degradation of the proposed gate change; making, via the processor, a gate change decision based on the margin value, wherein the gate change decision comprises one action of a list of actions comprising modifying the dataset to include the proposed gate change or outputting the model without the proposed gate change; and outputting a modified dataset.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
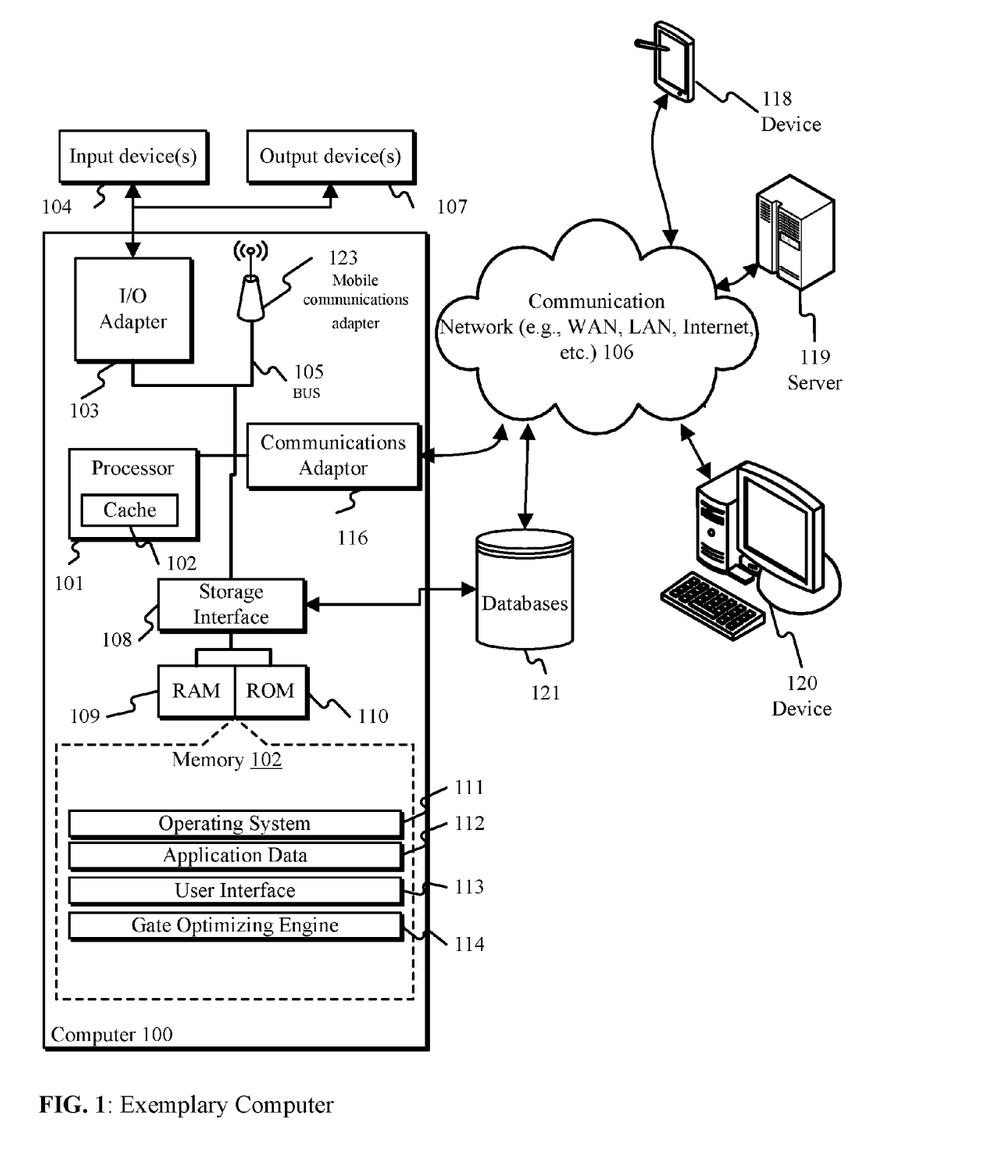
FIG. 1 depicts a block diagram of a computer system for use in practicing the teachings herein.

FIG. 1 illustrates a block diagram of an exemplary computing environment and computer system 100 (hereafter "computer 100") for use in practicing the embodiments described herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. Computer 100 therefore can embody a general-purpose computer. In another exemplary embodiment, the methods described herein are implemented as part of a mobile device, such as, for example, a mobile phone, a personal data assistant (PDA), a tablet computer, etc.

In an exemplary embodiment, in terms of hardware architecture, as shown in FIG. 1, the computer 100 includes processor 101. Computer 100 also includes memory 102 coupled to processor 101, and one or more input/output adapters 103 that may be communicatively coupled via system bus 105. Memory 102 may be operatively coupled to one or more internal or external memory devices via a storage interface 108. Communications adapter 116 may operatively connect computer 100 to one or more networks 106. System bus 105 may connect one or more user interfaces via input/output (I/O) adapter 103. I/O adapter 103 may connect a plurality of input devices 104 to computer 100. Input devices may include, for example, a keyboard, a mouse, a microphone, a sensor, etc. System bus 105 may also connect one or more output devices 107 via I/O adapter 103. Output device 107 may include, for example, a display, a speaker, a touchscreen, etc.

Processor 101 is a hardware device for executing hardware instructions or software, particularly that stored in a non-transitory computer-readable memory (e.g., memory 102). Processor 101 can be any custom made or commercially available processor, a central processing unit (CPU), a plurality of CPUs, for example, CPU 101a-101c, an auxiliary processor among several other processors associated with the computer 100, a semiconductor based microprocessor (in the form of a microchip or chip set), or generally any device for executing instructions. Processor 101 can include a cache memory 122, which may include, but is not limited to, an instruction cache to speed up executable instruction fetch, a data cache to speed up data fetch and store, and a translation lookaside buffer (TLB) used to speed up virtual-to-physical address translation for both executable instructions and data. Cache memory 122 may be organized as a hierarchy of more cache levels (L1, L2, etc.).

Processor 101 may be disposed in communication with one or more memory devices (e.g., RAM 109, ROM 110, one or more external databases 121, etc.) via a storage interface 108. Storage interface 108 may also connect to one or more memory devices including, without limitation, one or more databases 121, and/or one or more other memory drives (not shown) including, for example, a removable disc drive, etc., employing connection protocols such as serial advanced technology attachment (SATA), integrated drive electronics (IDE), IEEE-1394, universal serial bus (USB), fiber channel, small computer systems interface (SCSI), etc. The memory drives may be, for example, a drum, a magnetic disc drive, a magneto-optical drive, an optical drive, a redundant array of independent discs (RAID), a solid-state memory device, a solid-state drive, etc. Variations of memory devices may be used for implementing, for example, a gate model database 121 that stores one or more datasets of models of the gate configurations of various microprocessor designs.

Memory 102 can include random access memory (RAM) 109 and read only memory (ROM) 110. RAM 109 can be any one or combination of volatile memory elements (e.g., DRAM, SRAM, SDRAM, etc.). ROM 110 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 102 may incorporate electronic, magnetic, optical, and/or other types of non-transitory computer-readable storage media. Memory 102 may also be a distributed architecture, where various components are situated remote from one another, but can be accessed by processor 101.

The instructions in memory 102 may include one or more separate programs, each of which comprises an ordered listing of computer-executable instructions for implementing logical functions. In the example of FIG. 1, the instructions in memory 102 may include an operating system 111. Operating system 111 can control the execution of other computer programs and provides scheduling, input-output control, file and data management, memory management, and communication control and related services.

The instructions in memory 102 may further include application data 112, and a user interface 113.

Memory 102 may also include gate optimizing engine 114, configured to receive a dataset that includes a model of the gates of a microprocessor, model a proposed gate change to one or more gates in the model, make a gate determination based on a margin value that includes signal transmission time, a degradation of chip area if the proposed change were implemented, and a degradation of power requirements needed to power the microprocessor if the gate change were implemented. Gate optimizing engine 114 may make a gate change decision dynamically based on the margin value, and output a modified dataset based on the gate change decision.

I/O adapter 103 can be, for example but not limited to, one or more buses or other wired or wireless connections. I/O adapter 103 may have additional elements (which are omitted for simplicity) such as controllers, microprocessors, buffers (caches), drivers, repeaters, and receivers, which may work in concert to enable communications. Further, I/O adapter 103 may facilitate address, control, and/or data connections to enable appropriate communications among the aforementioned components.

I/O adapter 103 can further include a display adapter coupled to one or more displays. I/O adapter 103 may be configured to operatively connect one or more input/output (I/O) devices 107 to computer 100. For example, I/O 103 may connect a keyboard and mouse, a touchscreen, a speaker, a haptic output device, or other output device. Output devices 107 may include but are not limited to a printer, a scanner, and/or the like. Other output devices may also be included, although not shown. Finally, the I/O devices connectable to I/O adapter 103 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

According to some embodiments, computer 100 may include a mobile communications adapter 123. Mobile communications adapter 123 may include GPS, cellular, mobile, and/or other communications protocols for wireless communication.

In some embodiments, computer 100 can further include a communications adapter 116 for coupling to a network 106.

Network 106 can be an IP-based network for communication between computer 100 and any external device. Network 106 transmits and receives data between computer 100 and devices and/or systems external to computer 100. In an exemplary embodiment, network 106 can be a managed IP network administered by a service provider. Network 106 may be a network internal to an aircraft, such as, for example, an avionics network, etc. Network 106 may be implemented in a wireless fashion, e.g., using wireless protocols and technologies, such as WiFi, WiMax, etc. Network 106 may also be a wired network, e.g., an Ethernet network, an ARINC 429 network, a controller area network (CAN), etc., having any wired connectivity including, e.g., an RS232 connection, R5422 connection, etc. Network 106 can also be a packet-switched network such as a local area network, wide area network, metropolitan area network, Internet network, or other similar type of network environment. The network 106 may be a fixed wireless network, a wireless local area network (LAN), a wireless wide area network (WAN) a personal area network (PAN), a virtual private network (VPN), intranet or other suitable network system.

Network 106 may operatively connect computer 100 to one or more devices including device 120. Network 106 may also connect computer 100 to one or more servers such as, for example, server 119.

If computer 100 is a PC, workstation, laptop, tablet computer and/or the like, the instructions in the memory 102 may further include a basic input output system (BIOS) (omitted for simplicity). The BIOS is a set of essential routines that initialize and test hardware at startup, start operating system 111, and support the transfer of data among the operatively connected hardware devices. The BIOS is stored in ROM 110 so that the BIOS can be executed when computer 100 is activated. When computer 100 is in operation, processor 101 may be configured to execute instructions stored within the memory 102, to communicate data to and from the memory 102, and to generally control operations of the computer 100 pursuant to the instructions.

Figure 2:
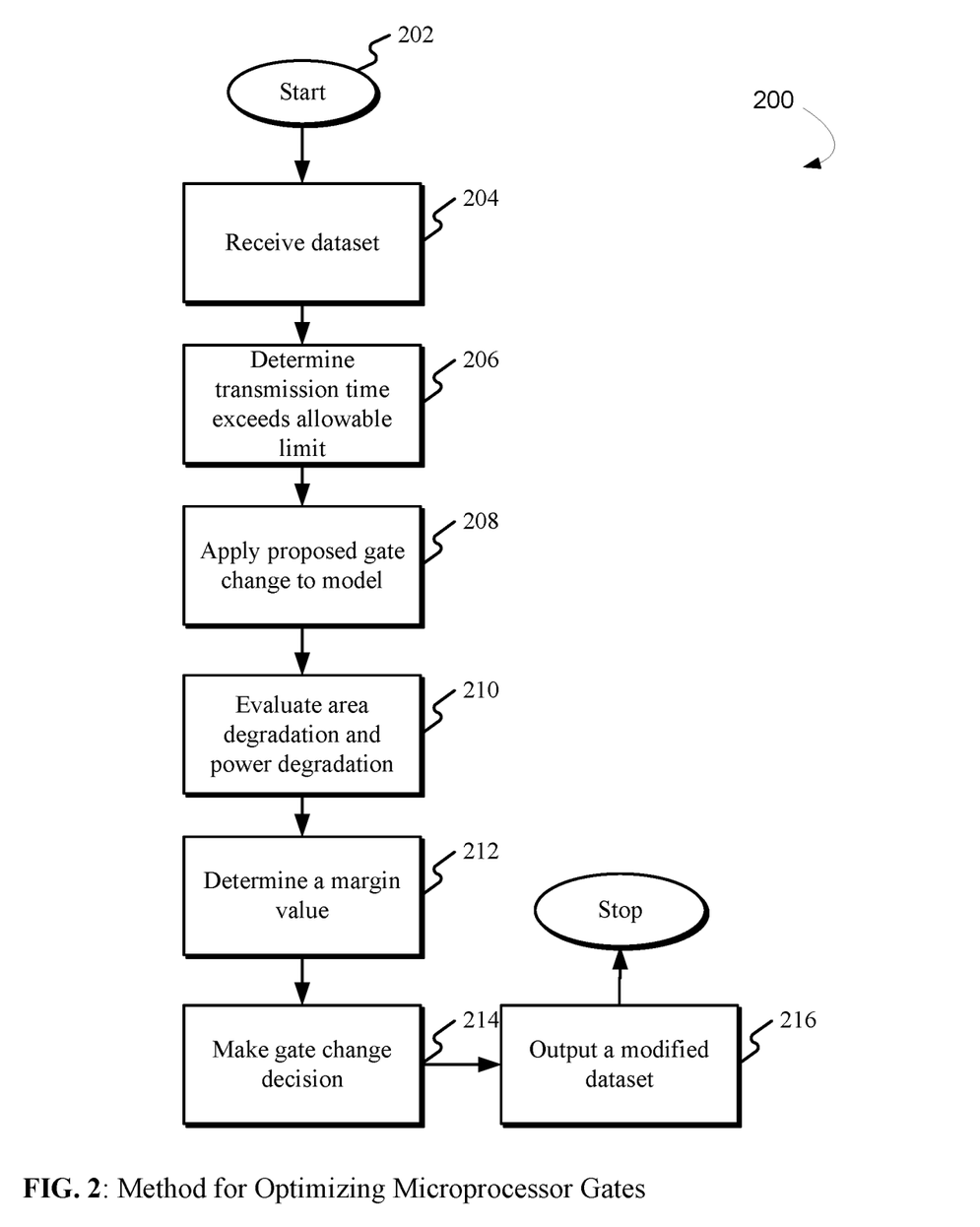
FIG. 2 depicts a method for optimizing microprocessor gates in a microprocessor gate design according to one embodiment.

FIG. 2 depicts a method 200 for optimizing microprocessor gates, in accordance with an embodiment. In some aspects, gate optimization may be accomplished in two design phases that include a first phase referred to as "coarse optimization" and a second phase referred to as a "fine optimization." In the coarse optimization, some embodiments may use a less accurate timing mode, which may perform gross optimizations as opposed to very fine adjustments correlated with timing. The final optimization stage, which may be performed following the coarse optimization, can include a higher level of precision in determining the balance between time, area, and power consumption. Accordingly, fine optimization steps may include more accurate, computationally intensive optimization calculation. Embodiments described herein may apply to both the coarse optimization stage and final optimization stage of gate optimization.

During gate design optimization, it may be desirable to control each change based on a maximization of performance benefits. Performance benefits may be measured in design "cost" that describes relative transmission time with respect to a particular gate transformation, and a cost that describes relative area needed to implement the gate transformation on the chip. The actual benefit associated with any particular change is increased or decreased with each proposed gate change because each of the cost factors (power, area, and transmission speed) may vary inversely or proportionally to one another depending on the particular change. For this reason, stepping through each proposed gate change in an effort to close the gate timing is in itself costly to make a full analysis of the effect of each change on the overall design. Analyzing each proposed change, using conventional methods, may be computationally intensive, time intensive, and manpower intensive.

The goal during both the coarse optimization stage is to maximize the trade-off between area time and power consumption in the overall circuit design. This trade-off, referred to herein as a "margin," is indicative of an overall benefit of trading area on a chip for transmission time. Margin is the cost in area of improving timing by 1 unit.

According to some embodiments, processor 101 may determine margin quantified as a floating point number greater than 0. Margin may quantify an increase or degradation of area, an increase or degradation of power, and/or an increase or degradation of transmission time necessary to transmit a signal from an input through one or more gates to an output. Increase/degradation in area/power is considered a "cost" while reduction/improvement of transmission time is considered a benefit. If transmission time increases then there is no benefit and such a change is not considered.

For example, each gate transformation makes a small change to design functionality. Some embodiments may determine actual benefit of the change quantified as the margin value, compare the cost to the benefit (or more precisely, determine whether the benefit (the margin value) of the proposed gate transformation meets or exceeds a predetermined margin target), and either accept the change or reject the change. In some aspects, processor 101 may reject the change and roll the design back to the original form if the proposed gate change does not meet or exceed the predetermined margin target. FIG. 2 depicts a method 200 for optimizing microprocessor gates.

Referring now to FIG. 2, after an initial starting step 202, processor 101 may receive, from database 121, a dataset including a model of a plurality of gates of a microprocessor, as shown in block 204.

As shown in block 206, processor 101 may perform a margin check by determining whether a transmission line in the model, if implemented in the physical circuit, would result in a signal transmission time less than or more than a predetermined threshold time.

As depicted in block 208, processor 101 may apply a proposed gate change to the model, where the proposed gate change transforms one or more of the gates in a transmission line on the chip. The gate change, if successful, would result in a signal transmission time less than the predetermined threshold time. According to some embodiments, processor 101 may receive the predetermined threshold time as an input by a user, where the predetermined threshold time is indicative of the maximum allowable time unit for transmission time from an input to output. The predetermined threshold time may be, for example, determined for an entire chip, for a particular sector of the chip, for a plurality of sectors of the chip, or one or more single transmission lines including one or more gates.

As shown in block 210, processor 101 may evaluate area and power degradation that would result in the proposed gate change. The area and power degradation (referred to as margin value), may be based on the signal transmission time, the area degradation value, and in some embodiments, the power degradation value. The margin value is indicative of a weighted comparison of the signal transmission time and the area degradation of the proposed gate change. In some aspects, area degradation may be 0 area units (the area needed to implement the proposed gate change does not affect area) or may be negative area units (the proposed gate change requires less area than the original design). In most cases, an increase in gate size is needed to decrease the time needed for transmission (decrease a change in timing referred to herein as "$delta_{timing}$")

The predetermined threshold time may specify a minimal benefit allowable for any particular gate change, where the change in time units is referred to as $delta_{timing}$. For example, if a predetermined threshold time indicates that the transmission time must be 118 time units or less on a particular transmission line, then closing the timing for the design would include making one or more gate changes sufficient to make total transmission time 118 time units or less. For example, processor 101 may determine that a signal clocks at 120 time units to transmit a signal from an input through the gate to an output. A proposed gate change would, if implemented, increase the gate size and/or location on the chip to reduce the time needed to transmit the signal from the input to the output by 2 units, making the full transmission time in 118 time units. Thus the $delta_{timing}$ for the proposed gate change is −2 units. If the proposed gate change makes the transmission time 118 time units or less, the timing is closed for that transmission line.

By increasing the size of the gate, the gate transformation may occupy more physical space on the chip. $delta_{area}$ is the cost incurred during the transformation. For example, the same change may decrease the time by −2 units of time, but the size for the new gate may increase from 2 size units to 4 size units. Accordingly, the $delta_{area}$ for the proposed gate transformation, +2 units may is from the date such that it may not fit in the current location, and must be relocated to another location.

In some embodiments, the proposed change may alter other aspects of the design, including an increase or decrease in channel lengths, an increase or decrease in power requirements etc., which may increase or reduce the intended benefit. For example, by increasing from 2 area units to area 4 units, ($delta_{area}$ being+2 units) the neighboring gate may also be impeded from growing in size and providing a greater (or maximized) net benefit. For the system to accept a proposed change, $delta_{timing}$ must exceed $delta_{area}$.

As shown in block 212, processor 101 may determine a margin value based on the signal transmission time, the area degradation value $delta_{area}$, and the power degradation value, where the margin value is indicative of a weighted comparison of the signal transmission time and the area degradation of the proposed gate change.

As shown in block 214, processor 101 may make a gate change decision based on the margin value, where the gate change decision includes either modifying the dataset to include the proposed gate change or outputting the model without the proposed gate change. Outputting the model without the proposed gate change may include making the proposed gate change, determining that the gate change is not optimal, and rolling back the dataset to the model without the proposed gate change.

Accordingly, as shown in block 216, processor 101 may output a modified dataset having optimized gate configurations. The optimized gate configurations close the timing on the transmission lines of the dataset while minimizing the cost in terms of area needed to implement the changes.

Figure 3:
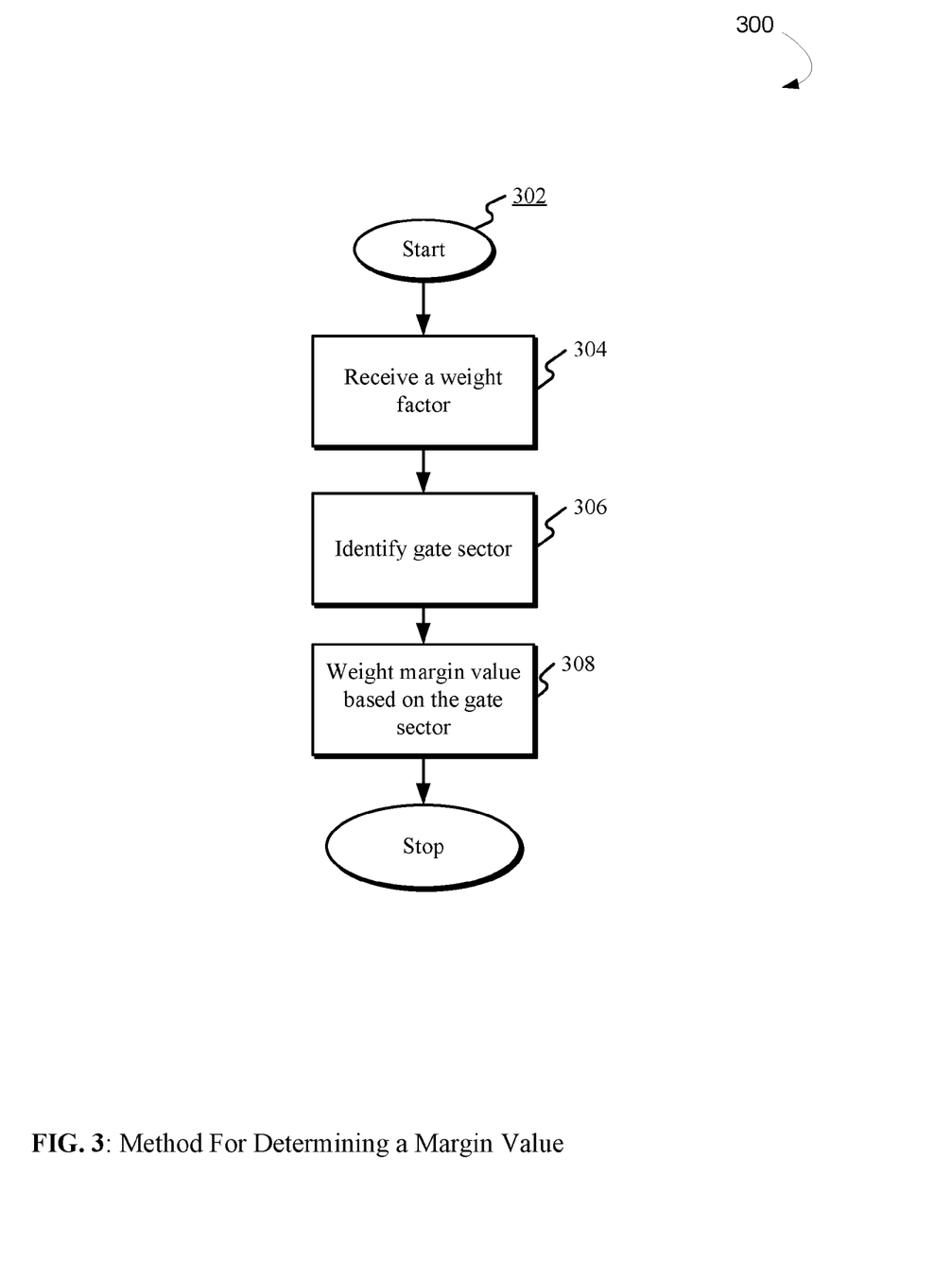
FIG. 3 depicts a block diagram of a method for determining a margin value according to one embodiment.

Referring again to block 212, processor 101 may determine a margin value for a proposed gate change. FIG. 3 depicts a method 300 for determining a margin value. Referring now to FIG. 3, as shown in block 304, processor 101 may receive a weight factor indicative of a relative criticality of at least one sector of the microprocessor with respect to one or more of signal transmission time and area degradation. A relative criticality may include a floating point number indicative of how critical a particular sector of the microprocessor is with respect to transmission time and/or area. For example, a weight factor may include information indicative that a minimum allowable improvement is 2 units, and a minimum allowable improvement that would be acceptable without further processing is 22 units. Anything less than 2 units may be rejected. Anything greater than 22 may be accepted without further analysis. The predetermined margin target of 3 may also be specified, which indicates that we do not want to accept any less than 3 units of improvement for every unit of cost.

As shown in block 306, processor 101 may identify a gate sector indicative of a portion of the microprocessor affected by the proposed gate change.

As shown in block 308, processor 101 may weight the margin value with the weight factor based on the gate sector. A weighted margin value may indicate how to compute margin when a proposed gate change results in an improvement that is multiples of a minimum allowable improvement (e.g., a relatively large improvement in comparison with a minimum). A weighted margin value may trigger a discount. For example, because 15 is a relatively a large improvement in comparison with other improvements, a discount in cost may be appropriate. $Delta_{timing}$ here is 15, minus minimal improvement. Processor 101 may divide the result by the total range of improvement. In other words, as we increase the improvement, the margin check constraints may be loosened to find an optimization point.

Figure 4:
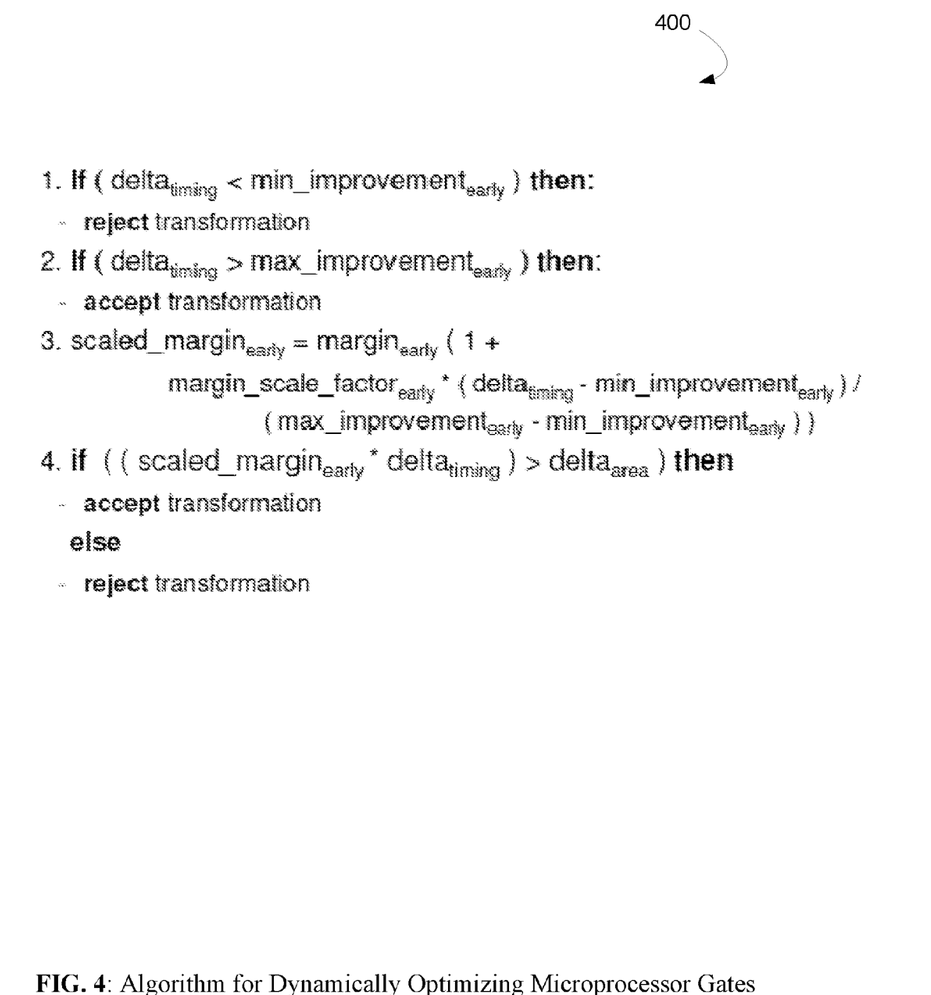
FIG. 4 depicts an algorithm for dynamically optimizing microprocessor gates.

As another example, a customer specification may specify the margin (e.g., a predetermined margin target) as a floating point number 2. Stated in another way, the customer may require that, for every 2 units in area cost in processor area, you must increase timing by at least 1 unit, or the changes must be rejected. The margin may not need to be enforced everywhere, but may be set more loosely depending on the microprocessor area (sector) affected by the proposed gate change. In other embodiments, some areas on a processor may be restricted to meet or exceed one predetermined margin target, while another area may be specified to meet or exceed a different predetermined margin target. For example, in some areas, it may not be possible to be so strict to enforce a predetermined margin (e.g., must be greater than 2 units of improvement). Accordingly, in some areas, the margin may be adjusted based on predetermined criteria specified by a user input or other setting saved in memory 102. FIG. 4 depicts an algorithm for dynamically optimizing microprocessor gates, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for optimizing microprocessor gates in a microprocessor comprising:
   receiving, via a processor, a dataset comprising a model of a plurality of gates of a microprocessor;
   determining, via the processor, whether a transmission line in the model, if implemented in a physical circuit, would result a signal transmission time less than a predetermined threshold time;
   applying to the model, via the processor, a proposed gate change to a physical size of one or more of the plurality of gates on a chip, wherein the proposed gate change results in a signal transmission time less than the predetermined threshold time;
   evaluating, via the processor and an area degradation value indicative of a physical occupation of space on the microprocessor based on the proposed gate change;
   determining, via the processor, a margin value based on the signal transmission time and the area degradation value, wherein the margin value is indicative of a weighted comparison of the signal transmission time and the area degradation of the proposed gate change;
   making, via the processor, a gate change decision based on the margin value, wherein the gate change decision comprises one action of a list of actions comprising modifying the dataset to include the proposed gate change or outputting the model without the proposed gate change; and
   outputting a modified dataset that is used to fabricate the chip with the microprocessor that comprises the plurality of gates with the changed physical sizes.

2. The computer-implemented method of claim 1, wherein determining whether the model would result a signal transmission time less than a predetermined threshold time comprises comparing the margin value to a predetermined margin target.

3. The computer-implemented method of claim 2, wherein the predetermined margin target is higher when a sector of the microprocessor is identified as timing critical.

4. The computer-implemented method of claim 2, wherein the predetermined margin target is lower when a sector of the microprocessor is identified as not timing critical.

5. The computer-implemented method of claim 2, further comprising:
   scaling, via the processor, the predetermined margin target based on the margin value exceeding a predetermined improvement threshold.

6. The computer-implemented method of claim 1, wherein determining the margin value comprises:
   receiving, via the processor, a weight factor indicative of a relative criticality of at least one sector of the microprocessor with respect to one or more of signal transmission time and area degradation;
   identifying, via the processor, a gate sector indicative of a portion of the microprocessor affected by the proposed gate change; and
   weighting the margin value with the weight factor based on the gate sector.

7. A system for optimizing microprocessor gates in a microprocessor comprising:
   a processor configured to:
   receive a dataset comprising a model of a plurality of gates of a microprocessor;
   determine whether a transmission line in the model, if implemented in a physical circuit, would result a signal transmission time less than a predetermined threshold time;
   apply to the model a proposed gate change to one or more of the plurality of gates, the proposed gate change transforming sizes of one or more gates on a chip, and wherein the proposed gate change results in a signal transmission time less than the predetermined threshold time;
   evaluate an area degradation value based on the proposed gate change;
   determine a margin value based on the signal transmission time and the area degradation value indicative of a physical occupation of space on the microprocessor, wherein the margin value is indicative of a weighted comparison of the signal transmission time, the area degradation of the proposed gate change;
   make a gate change decision based on the margin value, wherein the gate change decision comprises one action of a list of actions comprising modifying the dataset to include the proposed gate change or outputting the model without the proposed gate change; and
   output a modified dataset for fabricating the microprocessor comprising the one or more gates with the transformed sizes.

8. The system of claim 7, wherein the processor is configured to determine whether the model would result a signal transmission time less than a predetermined threshold time comprises comparing the margin value to a predetermined margin target.

9. The system of claim 8, wherein the predetermined margin target is higher when a sector of the microprocessor is identified as timing critical.

10. The system of claim 8, wherein the predetermined margin target is lower when a sector of the microprocessor is identified as not timing critical.

11. The system of claim 8, wherein the processor is further configured to:
    scale the predetermined margin target based on the margin value exceeding a predetermined improvement threshold.

12. The system of claim 7, wherein the processor is configured to:

receive a weight factor indicative of a relative criticality of at least one sector of the microprocessor with respect to one or more of signal transmission time and area degradation;

identify a gate sector indicative of a portion of the microprocessor affected by the proposed gate change; and determine the margin value by weighting the margin value with the weight factor based on the gate sector.

13. A non-transitory computer readable storage medium having program instructions embodied therewith for optimizing microprocessor gates in a microprocessor, the program instructions executable by a processor to cause the processor to perform a method comprising:

receiving a dataset comprising a model of a plurality of gates of a microprocessor;

determining whether a transmission line in the model, if implemented in a physical circuit, would result a signal transmission time less than a predetermined threshold time;

applying to the model, via the processor, a proposed gate change to one or more of the plurality of gates, the proposed gate change transforming sizes of one or more gates on a chip, and wherein the proposed gate change results in a signal transmission time less than the predetermined threshold time;

evaluating an area degradation value indicative of a physical occupation of space on the microprocessor based on the proposed gate change;

determining a margin value based on the signal transmission time and the area degradation value, wherein the margin value is indicative of a weighted comparison of the signal transmission time and the area degradation; and making a gate change decision based on the margin value, wherein the gate change decision comprises one action of a list of actions comprising modifying the dataset to include the proposed gate change or outputting the model without the proposed gate change; and outputting a modified dataset for fabricating the microprocessor comprising the one or more gates with the transformed sizes.

14. The computer readable storage medium of claim 13, wherein determining whether the model would result a signal transmission time less than a predetermined threshold time comprises comparing the margin value to a predetermined margin target.

15. The computer readable storage medium of claim 14, wherein the predetermined margin target is higher when a sector of the microprocessor is identified as timing critical.

16. The computer readable storage medium claim 14, wherein the predetermined margin target is lower when a sector of the microprocessor is identified as not timing critical.

17. The computer readable storage medium of claim 14, further comprising:

scaling, via the processor, the predetermined margin target based on the margin value exceeding a predetermined improvement threshold.

18. The computer readable storage medium of claim 13, wherein determining the margin value comprises:

receiving, via the processor, a weight factor indicative of a relative criticality of at least one sector of the microprocessor with respect to one or more of signal transmission time and area degradation;

identifying, via the processor, a gate sector indicative of a portion of the microprocessor affected by the proposed gate change; and weighting the margin value with the weight factor based on the gate sector.

* * * * *